(12) United States Patent
Mall, Jr.

(10) Patent No.: US 12,032,753 B2
(45) Date of Patent: Jul. 9, 2024

(54) IDENTIFICATION SYSTEMS AND METHODS FOR A USER INTERACTIVE DEVICE

(71) Applicant: Universal City Studios LLC, Universal City, CA (US)

(72) Inventor: Howard Bruce Mall, Jr., Winter Springs, FL (US)

(73) Assignee: Universal City Studios LLC, Universal City, CA (US)

( * ) Notice: Subject to any disclaimer, the term of this patent is extended or adjusted under 35 U.S.C. 154(b) by 534 days.

(21) Appl. No.: 17/234,394

(22) Filed: Apr. 19, 2021

(65) Prior Publication Data

US 2021/0342616 A1 Nov. 4, 2021

Related U.S. Application Data

(60) Provisional application No. 63/017,376, filed on Apr. 29, 2020.

(51) Int. Cl.
| | | |
|---|---|---|
| *G06K 9/18* | (2006.01) | |
| *G06F 3/03* | (2006.01) | |
| *G06K 7/10* | (2006.01) | |
| *G06K 7/14* | (2006.01) | |
| *G06V 10/10* | (2022.01) | |
| *G06V 10/143* | (2022.01) | |

(Continued)

(52) U.S. Cl.
CPC ....... *G06F 3/0304* (2013.01); *G06K 7/10722* (2013.01); *G06K 7/1413* (2013.01); *G06K 7/1417* (2013.01); *G06V 10/143* (2022.01); *G06V 10/145* (2022.01); *G06V 10/17* (2022.01); *G06V 10/60* (2022.01); *G06V 20/80* (2022.01); *G06V 30/19173* (2022.01); *G06V 30/224* (2022.01)

(58) Field of Classification Search
CPC ...... G06F 3/0304; G06V 10/17; G06V 10/60; G06V 10/143; G06V 30/224; G06V 20/80; G06V 10/145; G06V 30/19173; G06K 7/10722; G06K 7/1413; G06K 7/1417
See application file for complete search history.

(56) References Cited

U.S. PATENT DOCUMENTS

| | | |
|---|---|---|
| 6,935,756 B2 | 8/2005 | Sewall et al. |
| 8,351,087 B2 | 1/2013 | Amidror et al. |

(Continued)

FOREIGN PATENT DOCUMENTS

| | | |
|---|---|---|
| EP | 2273422 | 11/2017 |
| WO | 2017121956 | 7/2017 |

OTHER PUBLICATIONS

PCT/US2021/029176 International Search Report and Written Opinion dated Jul. 30, 2021.

*Primary Examiner* — Gregory M Desire
(74) *Attorney, Agent, or Firm* — Fletcher Yoder, P.C.

(57) ABSTRACT

An entertainment system includes a user interactive device having an identification assembly configured to generate a pattern of light via reflective material, a camera configured to capture the pattern of light generated by the reflective material, and a controller having processing circuitry and a memory. The memory stores machine-readable instructions configured to cause the processing circuitry to receive an indication of the pattern of light and determine identification data associated with the user interactive device based on the pattern of light.

20 Claims, 5 Drawing Sheets

(51) Int. Cl.
*G06V 10/145* (2022.01)
*G06V 10/60* (2022.01)
*G06V 20/80* (2022.01)
*G06V 30/19* (2022.01)
*G06V 30/224* (2022.01)

(56) References Cited

U.S. PATENT DOCUMENTS

| | | | |
|---|---|---|---|
| 9,443,310 B2* | 9/2016 | Hudman | A63F 13/833 |
| 9,993,733 B2* | 6/2018 | Athavale | A63F 13/25 |
| 10,773,164 B2* | 9/2020 | Mao | A63F 13/24 |
| 11,055,552 B2* | 7/2021 | Smoot | G06F 16/3331 |
| 11,538,265 B2* | 12/2022 | Krauthamer | G06T 7/70 |
| 2004/0156535 A1 | 8/2004 | Goldberg et al. | |
| 2018/0104600 A1 | 4/2018 | Stenzler | |

* cited by examiner

IDENTIFICATION SYSTEMS AND METHODS FOR A USER INTERACTIVE DEVICE

CROSS-REFERENCE TO RELATED APPLICATIONS

This application claims the benefit of U.S. Provisional Application Ser. No. 63/017,376, entitled "IDENTIFICATION SYSTEMS AND METHODS FOR A USER INTERACTIVE DEVICE" and filed Apr. 29, 2020, which is hereby incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

In entertainment venues, user interactive devices, including handheld objects, may be used in coordination with other system components to provide interactive experiences. For example, a system may identify that a particular user is holding a user interactive device via communication signals sent from the user interactive device, such that the system may provide an experience specific to the user or track information related to the user. In the setting of a theme park, the user interactive device may be powered via batteries or a power cord. However, the circuitry providing the communication signals and/or powering the user interactive device (e.g., including communication circuitry, power circuitry, processing circuitry) may be expensive to implement or manufacture, and/or take up valuable space in the user interactive device or cause the user interactive device to be bulky. Moreover, the user interactive device may require charging, require replacement of batteries, or have limited mobility. It is now recognized that there is a need for improved systems and methods for identifying user interactive devices to facilitate interactive user experiences via the user interactive devices.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an entertainment system includes a user interactive device having an identification assembly configured to generate a pattern of light via reflective material, a camera configured to capture the pattern of light generated by the reflective material, and a controller having processing circuitry and a memory. The memory stores machine-readable instructions configured to cause the processing circuitry to receive an indication of the pattern of light and determine identification data associated with the user interactive device based on the pattern of light.

In an embodiment, one or more non-transitory, computer-readable media are provided storing instructions which, when executed by at least one processor, cause the at least one processor to perform operations including receiving an indication of a pattern of light reflected by a user interactive device, determining identification data associated with the user interactive device based on the pattern of light, and providing an interactive user experience based on the identification data.

In an embodiment, a user interactive device includes a body configured to be held by a user and an identification assembly coupled to the body. The identification assembly includes reflective material configured to reflect light and non-reflective material disposed over the reflective material. Apertures are formed within the non-reflective material, and the reflective material is configured to reflect light through the apertures to generate a pattern of light for identification of the user interactive device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
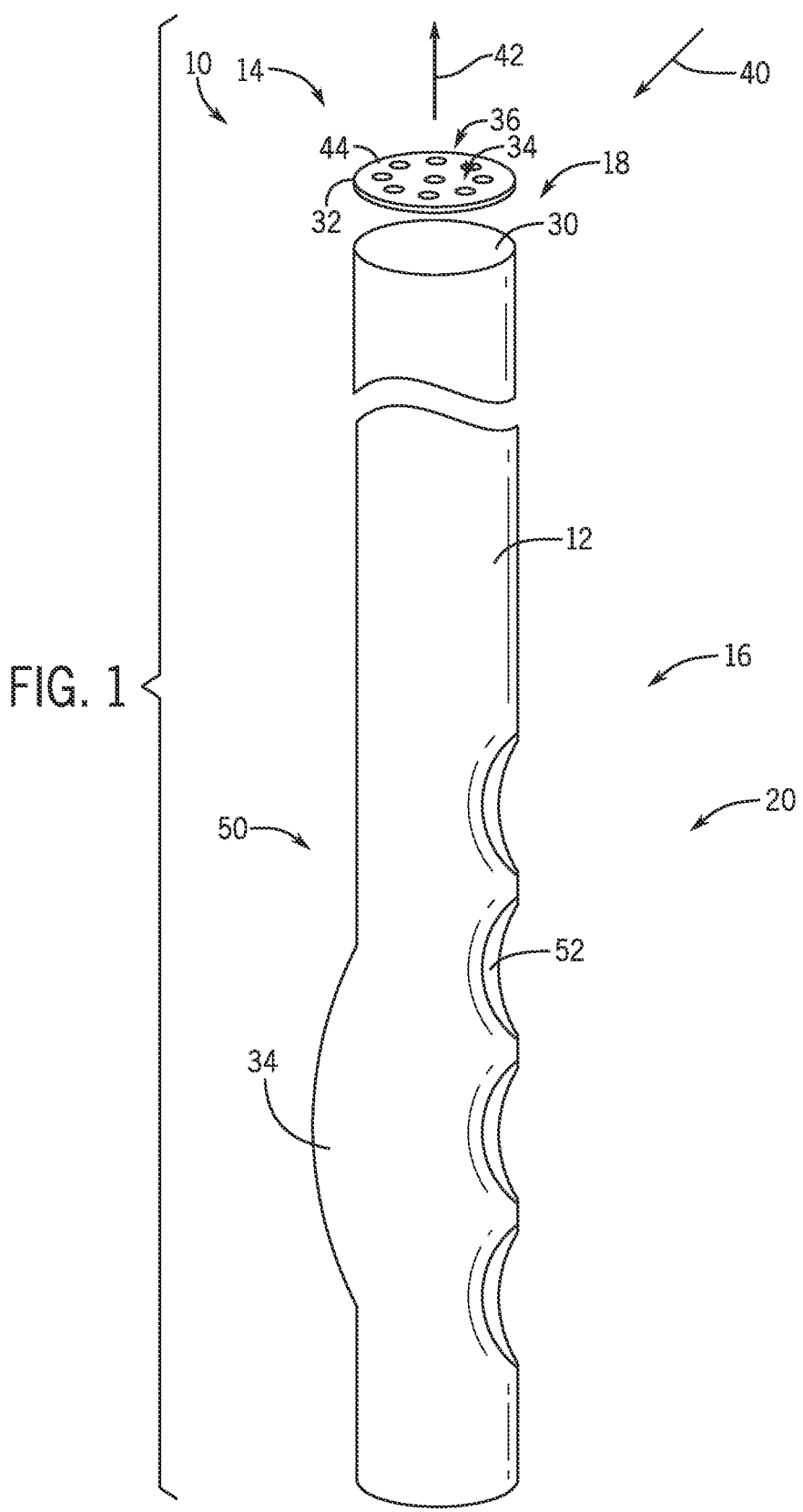
FIG. 1 is a schematic diagram of a user interactive device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In entertainment venues, user interactive devices, including handheld objects, may be used in coordination with other system components to provide interactive experiences. For example, a user interactive device and/or a user of the user interactive device may be identified based on communication between the user interactive device and a sensor or another system. After identifying the user interactive device, the system may provide an experience for the user and/or may track information related to the user. The user interactive device may be powered via batteries, a power cord, and/or another suitable power source. However, the circuitry enabling the communication and/or powering the user interactive device (e.g., including communication circuitry, power circuitry, processing circuitry) may be expensive to implement or manufacture, and/or take up valuable space in the user interactive device or cause the user interactive device to be bulky. Moreover, the user interactive device may require charging, require replacement of batteries, or have limited mobility.

In some instances, a user interactive device may use radio-frequency identification (RFID) to enable systems to identify and track the user interactive device. However, some environments may not be suitable for RFID identification and tracking. For example, some environments may have radio interference, other RFID tags that may interfere the RFID tag of the user interactive device, form-factor issues relative to the RFID technology, and/or require a relatively close proximity to an RFID sensor to read an RFID tag.

The present disclosure relates generally to an identification assembly of a user interactive device that may passively identify the user interactive device. That is, the user interactive device may be identified without being powered by batteries or via another power source. For example, the identification assembly may reflect a pattern of light unique to the user interactive device. An image sensor (e.g., a camera) may detect the reflected pattern of light, and a controller may identify the user interactive device and/or the user based on the pattern of light. The pattern of light may be any suitable pattern that uniquely identifies the user interactive device. For example, the pattern of light may be in the form of or include a Quick Response (QR) code, a bar code, one or more words (e.g., a user's name, a character name), one or more shapes (e.g., dots, circles, squares, rectangles, stars, ovals) dispersed relative to one another, multiple colors (e.g., light frequencies), one or more images (e.g., a person, an animal, an object), and/or sequences of shapes, characters, numbers, or patterns. As used herein, the term "pattern of light" implicitly encompasses a corresponding or reciproical pattern of darkness or shadow, and discussion of a "pattern of light" herein encompasses use of the corresponding dark pattern where appropriate.

The identification assembly of the user interactive device may include reflective material that reflects light to generate the pattern. For example, the identification assembly may include a layer of reflective material and a layer of non-reflective material. In certain embodiments, the layer of non-reflective material may be disposed over the layer of reflective material, and the layer of non-reflective material may include apertures through which light is reflected by the reflective material to generate the pattern of light. In other embodiments, the user interactive device may include the reflective material only in the pattern corresponding to the pattern of light. In such embodiments, non-reflective material may be omitted from the user interactive device, or a layer of non-reflective material may be disposed under the layer of reflective material to provide a non-reflective background, thereby facilitating generation of the pattern of light.

After determining identification data for the user interactive device and/or the user based on the unique pattern of light, an entertainment system, such as an entertainment system including the user interactive device, a camera, and other components described herein, may provide an experience specific to the user. For example, the entertainment system may identify a user profile associated with the user interactive device and may display the user's name, a character's name associated with the user's profile, an image of a character associated with the user's profile, an image overlaid on a captured image of the user, and/or other experiences unique to the user. As such, the identification assembly of the user interactive device described herein may facilitate providing an interactive user experience via a passive user interactive device.

By way of introduction, FIG. 1 is a schematic diagram of a user interactive device 10, according to embodiments of the present disclosure. The user interactive device 10 may include a body 12, which may be any suitable shape. As illustrated, the body 12 may be shaped as a shaft or wand, though in other embodiments, the body 12 may include any shape that a user may point with (e.g., a projective device (such as a gun), a wearable item (such as a glove), a wrist-mounted device (such as a watch)). The body 12 may include an identification assembly 14 and/or a handle 16. As illustrated, the identification assembly 14 is disposed generally at a first end 18 of the body 12, and the handle 16 is disposed generally at a second end 20 of the body 12 opposite the first end 18. In certain embodiments, the identification assembly 14 and the handle 16 may be disposed at the same end of the body 12 (e.g., at the first end 18 or the second end 20), or the identification assembly 14 and/or the handle 16 may be disposed between the ends 18 and 20.

The identification assembly 14 may include reflective material 30 (e.g., a layer of reflective material) disposed at or near the first end 18 of the user interactive device 10 and non-reflective material 32 (e.g., a layer of non-reflective material) disposed on the reflective material 30. The non-reflective material 32 may include apertures 34 arranged in a pattern 36 that is unique to the user interactive device 10, such that a pattern of light reflected by the reflective material 30 in the pattern 36 may be used to determine identification data for the user interactive device 10, a user associated with the user interactive device 10, and/or a user profile associated with the user interactive device 10. For example, incoming light, represented by arrow 40, may be reflected by the reflective material 30, as indicated by arrow 42, through the apertures 34 to generate a pattern of light that matches the pattern 36 of apertures 34.

The reflective material 30 may reflect light that is visible and/or invisible to the human eye. In the cases where the reflective material 30 reflects invisible light, the invisible light may include infrared light, ultraviolet light, or any other suitable electromagnetic wavelengths not typically perceived by the human eye. Additionally, the reflective material 30 may include any suitable reflective material(s) for the electromagnetic wavelengths in question, such as aluminum, steel, other reflective metals, and/or other reflective materials. The non-reflective material 32 may include any suitable non-reflective material(s) for the electromagnetic wavelengths in question, such as plastic, ceramic, fabric, conditioned metal(s), and/or other non-reflective materials. In certain embodiments, the non-reflective material 32 may generally be black and/or another dark color that does not reflect light or that reflects a minimal amount of light.

The reflective material 30 and/or the non-reflective material 32 may be coupled to the user interactive device 10 via an adhesive, fastener(s), and/or other suitable coupling mechanisms. The non-reflective material 32 may be disposed over or on top of the reflective material 30 (such that the non-reflective material 32 is closer to the first end 18 than the reflective material 30). In some embodiments, the non-reflective material 32 may be coupled to the reflective material 30 via an adhesive, fastener(s), and/or other suitable coupling mechanisms. In some embodiments, the reflective material 30 may be a first layer of material with an adhesive backing applied to the first end 18 of the user interactive device 10, and the non-reflective material 32 may be a second layer of material with an adhesive backing applied to and over the first layer of material (e.g., the reflective material 30), such that the reflective material 30 is only exposed to light via the apertures 34 of the non-reflective material 32.

In certain embodiments, the non-reflective material 32 may be arranged in the pattern 36 on top of or over the reflective material 30 (e.g., a full/complete layer of the reflective material 30), such that the pattern of reflected light includes the portion 44 as reflected light and the pattern 36 as voids within the reflected light (e.g., portions in which reflected light is absent). In such embodiments, an image sensor may uniquely identify the user interactive device 10 based on the pattern of light having voids within the pattern of light.

As illustrated, the apertures 34 of the pattern 36 are circles (e.g., dots). In certain embodiments, the pattern 36 may include other shapes (e.g., squares, stars, rectangles, ovals) in addition to, or in place of, the apertures 34. In some embodiments, the pattern 36 may include one or more words, such as the user's name, a name of a character associated with and/or selected by the user, another word associated with the user, and/or word(s) associated with an amusement ride or other entertainment system. In certain embodiments, the pattern 36 may include a barcode, a Quick Response (QR) code, a Universal Product Code (UPC), a serial number, a product number, a part number, or another suitable identifier. In some embodiments, the pattern 36 may include one or more images, such as a person, an animal, an object, or another suitable image.

In certain embodiments, the pattern 36 may include multiple light frequencies that uniquely identify the user interactive device 10. In the visible light spectrum, different light frequencies correspond to different colors. For example, the identification assembly 14 may include one or more frequency filters (e.g., color filters for visible light) disposed over the reflective material 30 (e.g., between the reflective material 30 and the non-reflective material 32 or over both the reflective material 30 and the non-reflective material 32) through which the outgoing light 42 passes to generate one or more frequencies of light on a surface. In some embodiments, the reflective material 30 or the non-reflective material 32 may include frequency filters through which light is reflected to generate the outgoing light 42 in the one or more frequencies. The one or more frequencies may correspond to input values to a controller, such as the controller 140 described below in reference to FIG. 5. In some embodiments, based on the sequence of input values, the controller may determine identification data for the user interactive device 10, a user associated with the user interactive device 10, and/or a user profile associated with the user interactive device 10.

The user interactive device 10 may include a handheld device (e.g., a handheld object). In some embodiments, the user interactive device 10 (e.g., the handle 16 of the user interactive device 10) may include one or more holding features 50, such as one or more depressed finger indentations 52 and/or ridges 54. The holding features 50 may guide a user to hold the user interactive device 10 in a particular manner. For example, the holding features 50 may ensure that a user holds the user interactive device 10 in a constant orientation such that the user does not move (e.g., shift, rotate) the identification assembly 14 while holding or using the user interactive device 10. The holding features 50 may include any additional or other suitable feature that prevents movement of the user interactive device 10 when held by the user, such as a finger guard (e.g., to ensure that the user inserts their index finger in the guard and thus will be unlikely to move the user interactive device 10) relative to the user's grip orientation. This may facilitate capturing the reflected pattern of light by an image sensor at a desired or suitable orientation, and more accurate identification of the user interactive device 10 based on the pattern of light.

Because the components of the user interactive device 10 (e.g., the body 12, the reflective material 30, the non-reflective material 32) are passive and relatively simple components, the user interactive device 10 may be relatively easy to mass-produce. Moreover, because the components are relatively small (e.g., each may have a diameter of less than three centimeters (cm), less than two cm, less than one cm, less than 0.5 cm, less than 0.3 cm), the identification assembly 14 may have low visual impact. That is, the identification assembly 14 may not take away from the user experience of using the user interactive device 10. Moreover, if the light reflected by the identification assembly 14 is invisible to the human eye (e.g., infrared light, ultraviolet light), the identification assembly 14 may have an even lower visual impact.

Additionally, because the user interactive device 10 may reflect a pattern of light without being powered, such as via batteries, the user interactive device 10 may operate without being recharged or without having batteries replaced. Further, because the user interactive device 10 is not otherwise connected to another suitable power source, such as a power cord, the user interactive device 10 may have increased mobility relative to other systems.

While the user interactive device 10 is described herein as being an unpowered system, in certain embodiments, the user interactive device 10 may include a powered light source (e.g., a light producing device, such as a light bulb, LED, OLED) that emits light from the first end 18 of the user interactive device 10 to generate the pattern of light. For example, the powered light source may emit light through the apertures 34 of the non-reflective material 32. In such embodiments, communication and/or processing circuitry may still be omitted from the user interactive device 10, thereby reducing costs and complexity associated with the user interactive device 10.

The user interactive device 10 may be associated with a user and/or a user profile based on an initial identification sequence that, in some cases, includes the user being assigned or choosing the user interactive device 10. For example, in a theme park setting, the user may be assigned or may select the user interactive device 10 from multiple available user interactive devices. This may occur when the user purchases the user interactive device 10 in a retail store separate from but associated with the theme park, enters the theme park, enters a specific area or zone of the theme park, enters an entertainment system of the theme park, and/or enters an amusement ride of the theme park. After the user is assigned or has selected the user interactive device 10, the user's name, identification card, a character name, the user's profile, and/or other identification data may be associated with or linked to the user interactive device 10. A relationship between identifying information of the user interactive device 10, such as the pattern of light reflected by the user interactive device 10, and identification data of the user and/or the user's profile may be stored in a database for later retrieval to provide a user interactive experience for the user. For example, as described in greater detail below, the identification data corresponding to the user and/or the user profile may be determined based on detecting and identifying the pattern of light reflected by the user interactive device 10.

Figure 2:
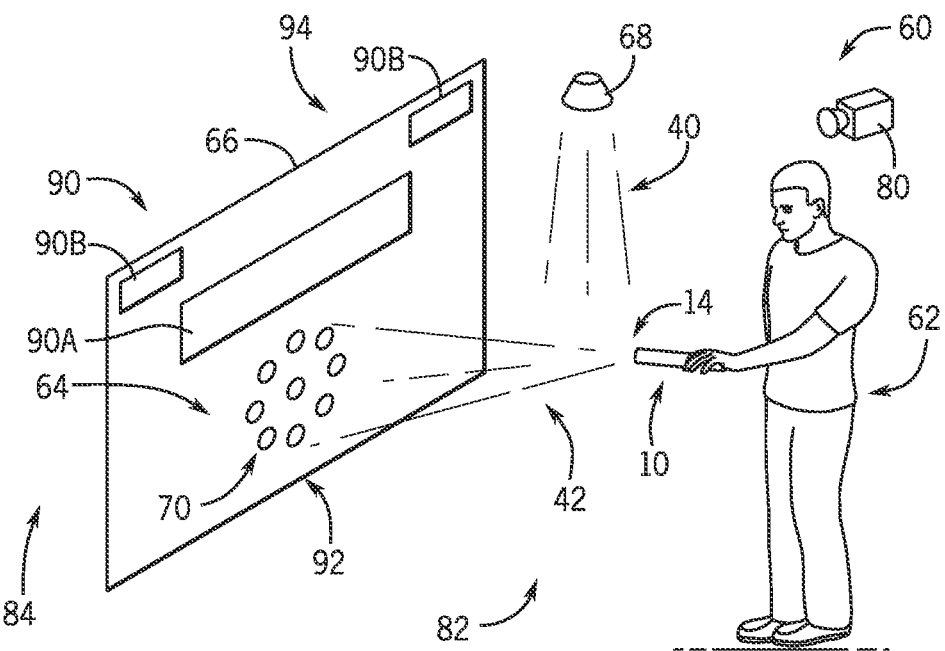
FIG. 2 is a schematic diagram of an entertainment system with the user interactive device of FIG. 1 producing a first light pattern for identification purposes, according to an embodiment of the present disclosure.

With this in mind, FIG. 2 is a schematic diagram of an entertainment system 60 (e.g., of a theme park attraction, an interactive exhibit, an interactive display system) with a user 62 holding the user interactive device 10 to generate a pattern of light 64 (e.g., a first pattern of light), according to embodiments of the present disclosure. In some embodiments, the entertainment system 60 may include a surface 66 at which the user 62 may point the user interactive device 10 to display the pattern of light 64. Displaying the pattern of light 64 on the surface 66 may facilitate determining identification data for the user interactive device 10, a user associated with the user interactive device 10, and/or a user profile associated with the user interactive device 10, and enable the entertainment system 60 to output a user interaction experience (e.g., a user interactive experience, an interactive user experience) based on the identification data. For example, the user interaction experience output by the entertainment system 60 may include video, audio, and/or image data associated with characters popular with children, a television or movie-themed setting, a shooting gallery, a collection of targets, and so on.

The entertainment system 60 may include a light source 68 that emits light toward the user interactive device 10 (e.g., the incoming light 40) to enable the user interactive device 10 to generate the pattern of light 64 on the surface 66 (e.g., via the reflected light 42). For example, the light source 68 may be positioned generally above and/or proximate the surface 66, such that the light 40 may be received by the identification assembly 14 of the user interactive device 10 and reflected by the reflective material 30 through the non-reflective material 32 to generate the pattern of light 64. In some embodiments, the light source 68 may be coupled to the surface 66. The light source 68 may include a lamp, light-emitting diodes (LEDs), organic LEDs (OLEDs), light-directing features (e.g., a shade, a panel, a reflecting screen, one or more baffles), and/or another suitable lighting component. In certain embodiments, the entertainment system 60, or portion(s) thereof, may be positioned outdoors, such that natural light (e.g., sunlight) may be the incoming light 40 that is reflected by the identification assembly 14 to generate the pattern of light 64. In such embodiments, the light source 68 may include a directing/focusing mechanism (e.g., a set of baffles) that directs and/or focuses the natural light toward the identification assembly 14.

As illustrated, the pattern of light 64 generally matches the pattern 36 of FIG. 1. That is, dots 70 of light generated with the pattern of light 64 generally match the apertures 34 of the non-reflective material 32. As described in greater detail with respect to FIGS. 3 and 4, the pattern of light reflected by the identification assembly 14 may include other patterns that generally match the pattern provided by the non-reflective material 32. Additionally, as described above, the pattern of light 64 may include portions of the shadow/darkness around light reflected onto the surface 66. For example, the pattern of light 64 may include darkness between the dots 70 and/or darkness disposed otherwise relative to the dots 70.

The entertainment system 60 may include a camera 80 or other image capture device that captures the pattern of light 64 reflected by the user interactive device 10 (e.g., as exhibited by the surface 66). A controller or control system (such as the controller 140 illustrated in FIG. 5 and discussed in further detail below) may be communicatively coupled to the camera 80, and may identify the user interactive device 10 based on the captured pattern of light 64 reflected by the user interactive device 10. As illustrated, the camera 80 is disposed on a first side 82 of the surface 66. The surface 66 may be a non-transparent surface that facilitates detection and capture of the pattern of light 64 by the camera 80 while disposed on the first side 82. For example, the surface 66 may include a wall, a poster affixed to the wall, a projection screen, and so on. In certain embodiments, the camera 80 may be disposed on a second side 84 (e.g., a backside) of the surface 66 generally opposite the first side 82, and directed at the surface 66. In such embodiments, the surface 66 may be transparent or semi-transparent to facilitate detection and capture of the pattern of light 64 by the camera 80 while disposed on the second side 84. For example, the surface 66 may include a one-way mirror or glass, such that the user 62 may only see a reflection and/or a displayed image, and the camera 80 may see through the surface 66 to detect and capture the pattern of light 64.

In certain embodiments, the surface 66 may include one or more output devices 90, such as an electronic display 90A or speakers 90B. In some embodiments, some or all of the output devices 90 may be attached to or separate from the surface 66. The controller (such as the controller 140 illustrated in FIG. 5 and discussed in further detail below) may instruct the output device 90 to output a user interaction experience (e.g., a certain movement or actuation, image, video, or audio data) corresponding to the determined identification data for the user interactive device 10, the user 62 associated with the user interactive device 10, and/or a user profile associated with the user interactive device 10, as determined by the controller. The user interaction experience may include the controller instructing the speakers 90B to output audio associated with the identification data, such as a name of the user 62 or a character's name associated with the user 62. As yet another example, the user interaction experience may include the controller instructing the display 90A to play a video specific to the identification data, such as a video of a character associated with the identification data, a video including image(s) of the user 62, or other suitable videos. In some embodiments, the entertainment system 60 may track a position and/or orientation of the user interactive device, such that the user 62 may at least partially control (e.g., through movement or position) video provided by the display 90A and/or audio provided by the speakers 90B.

In some embodiments, the controller 140 may track the pattern of light 64 during the user interaction experience and via the camera 80, thereby facilitating user interactions with the entertainment system 60. That is, the user 62 may move the user interactive device 10 during the user interaction experience, such that the pattern of light 64 moves and/or otherwise changes on the surface 66. The controller 140 may adjust the user interaction experience based on the changes of the pattern of light 64 (as captured by the camera 80) and/or based on the identification data for the user interactive device 10. By way of specific example, the controller 140 may retrieve the identification data based on an initial capture of the pattern of light 64, and the identification data may indicate that the user 62 has obtained a particular level in the user interaction experience. The controller 140 may adjust the user interaction experience based on the level and/or based on changes in the pattern of light 64 (e.g., based on movement of the user interactive device 10 that causes the changes in the pattern of light 64). For example, if the controller 140, via the camera 80, determines that the pattern of light 64 has moved in a first direction (e.g., to the left, upwards, and so on to indicate a gesture), then the controller 140 may output a first responsive user interaction experience based on the first direction. If the controller 140, via the camera 80, determines that the pattern of light 64 has moved in a second direction (e.g., to the right, downwards, and so on to indicate another gesture), then the controller 140 may output a second responsive user interaction experience based on the second direction. In certain embodiments, the electronic display 90A or the speakers 90B may provide a message that prompts the user 62 to move the user interactive device 10, thereby causing the user 62 to adjust positioning of the pattern of light 64 over time via the user interactive device 10. This positioning over time may correspond to a gesture, which results in a shape cumulatively formed by the various positions over a timer period. If the controller 140, via the camera 80, determines that the pattern of light 64 has moved according to the prompt (e.g., corresponding to a gesture or shape), then the controller 140 may output a corresponding user interaction experience. In this manner, the user interactive device 10 may enhance the user's experience with the entertainment system 60 by providing a dynamic user interaction experience.

As illustrated, the pattern of light 64 is reflected onto a first portion 92 of the surface 66, and the output devices are included in a second portion 94 that is separate from the first portion 92. In some embodiments, the first portion 92 and the second portion 94 may at least partially overlap, such that the pattern of light 64 may be reflected by the display 90A and/or another portion of the surface 66. In some embodiments, the display 90A may be the entire surface 66 or a majority of the surface 66.

In certain embodiments, the identification assembly 14 may include other components that reflect light and generate the pattern of light 64 that uniquely identifies the user interactive device 10. For example, the identification assembly 14 may include light frequency filter(s) and/or a three-dimensional structure that reflects a Benton hologram onto the surface 66 (e.g., the pattern of light 64 may include a Benton hologram), which may include an image having multiple/different frequencies and/or colors. For example, first portions of the identification assembly 14 may extend further from the first end 18 than other, second portions, such that the first portions reflect light at different angles and/or distances relative to the second portions. As the user interactive device 10 changes position/angle relative to the surface 66, the pattern of light 64 on the surface 66 may change due to the three-dimensional structure of the identification assembly 14. However, the pattern of light 64 may remain unique to the user interactive device 10, such that the controller of the entertainment system 60 may uniquely identify the user interactive device 10 based on the pattern of light 64 that changes based on position/angle and is captured by the camera 80.

Because the user interactive device 10 may not need to send identification information via communication circuitry and/or processing circuitry, the cost of implementing or manufacturing the user interactive device 10 may be reduced, and space in the user interactive device 10 may be saved. Additionally, as described above, because the user interactive device 10 may reflect a pattern of light without being powered, such as via batteries, a power cord, or another suitable power source, the user interactive device 10 may operate without being recharged and may have increased mobility relative to other systems. For example, the user 62 may fluidly interact with the entertainment system 60 and then proceed to another entertainment system, such as another entertainment system configured for interaction with the user interactive device 10, without recharging or connecting the user interactive device 10. Further, the user interactive device 10 may scale the reflection (e.g., enlarge the pattern of light 64) to facilitate capture of the reflection by the camera 80, thereby enabling a less expensive and/or lower quality camera 80 to be included in the entertainment system 60.

Figure 3:
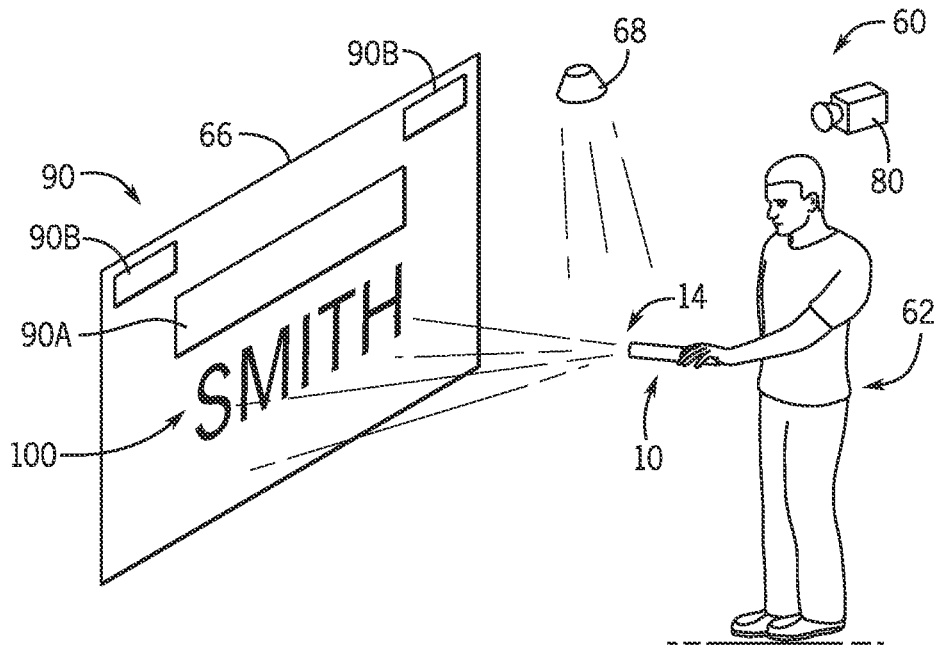
FIG. 3 is a schematic diagram of an entertainment system with the user interactive device of FIG. 1 producing a second light pattern for identification purposes, according to an embodiment of the present disclosure.

FIG. 3 is a schematic diagram of the entertainment system 60 with the user 62 holding the user interactive device 10 to generate a pattern of light 100 (e.g., a second pattern of light), according to embodiments of the present disclosure. As illustrated, the pattern of light 100 is in the form of text (e.g., the word "SMITH"). The camera 80 may capture an image, including the pattern of light 100, and the controller (such as the controller 140 illustrated in FIG. 5 and discussed in further detail below) may determine identification data for the user interactive device 10, the user 62 associated with the user interactive device 10, and/or a user profile associated with the user interactive device 10 based on the pattern of light 100. The text of the pattern of light 100 (e.g., the word "SMITH") may be the name of the user 62, the name of a character associated with the user 62, or any suitable identifier. For example, the pattern of light 100 may include other word(s) that uniquely identify the user interactive device 10, such as a location, an object name (e.g., "THE GREAT SWORD"), or other suitable words. Additionally, as described above, the pattern of light 100 may include portions of the shadow/darkness around light reflected onto the surface 66. For example, the pattern of light 100 may include darkness between letters of the word "SMITH" and/or darkness disposed otherwise relative to the word "SMITH".

Figure 4:
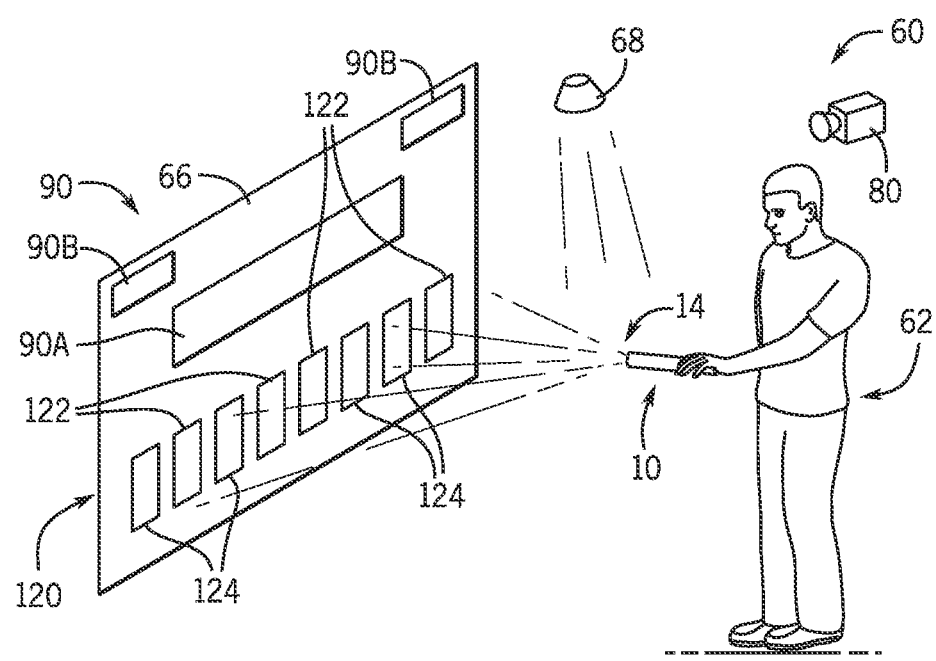
FIG. 4 is a schematic diagram of an entertainment system with the user interactive device of FIG. 1 producing a third light pattern for identification purposes, according to an embodiment of the present disclosure.

FIG. 4 is a schematic diagram of the entertainment system 60 with the user 62 holding the user interactive device 10 to generate a pattern of light 120 (e.g., a third pattern of light), according to embodiments of the present disclosure. As illustrated, the pattern of light 120 includes bars 122, where light is reflected at a predetermined frequency, and bars 124, where light at the predetermined frequency is absent. For example, the bars 122 may be at a predetermined frequency corresponding to a certain color (e.g., red, blue, green). The bars 124 may be not have light (e.g., the bars 124 may be absent/omitted in the pattern of light 120), or one or more of the bars 124 may have light at one or more frequencies different from the predetermined frequency of the bars 122. The camera 80 may capture an image including the pattern of light 120, and the controller (such as the controller 140 illustrated in FIG. 5 and discussed in further detail below)

may determine identification data for the user interactive device 10, the user 62 associated with the user interactive device 10, and/or a user profile associated with the user interactive device 10 based on the pattern of light 120.

In certain embodiments, the predetermined frequency included in the pattern of light 120 may be indicative of a binary sequence that is unique to the user interactive device 10. For example, the controller may determine that light at the bars 122 is at the predetermined frequency and may assign a first binary number "1" in a binary sequence corresponding to the bars 122 and 124. Additionally, the controller may determine that light at the bars 124 is absent and/or is at frequency(ies) other than the predetermined frequency and may assign a second binary number "0" in the binary sequence. As such, the controller may determine a binary sequence of "01011001" for the illustrated pattern of light 120 that may uniquely identify the user interactive device 10. Accordingly, the controller may determine identification data for the user interactive device 10, the user 62 associated with the user interactive device 10, and/or a user profile associated with the user interactive device 10 based on the binary sequence. Using the binary sequence to identify the user interactive device 10 may increase an amount of unique identifiers available for multiple user interactive devices 10. For example, the illustrated sequence of eight binary numbers provides over four billion unique identifiers for the user interactive devices 10. In certain embodiments, the pattern of light 120 may include more or fewer bars at certain frequencies to enable more or fewer unique identifiers for the user interactive devices 10. Additionally, while the illustrated pattern of light 120 includes bars 122 and 124 that may include reflected light, other embodiments of the pattern of light 120 with light at one or more frequencies may include other shapes (e.g., circles, squares, stars, and other objects/shapes).

Figure 5:
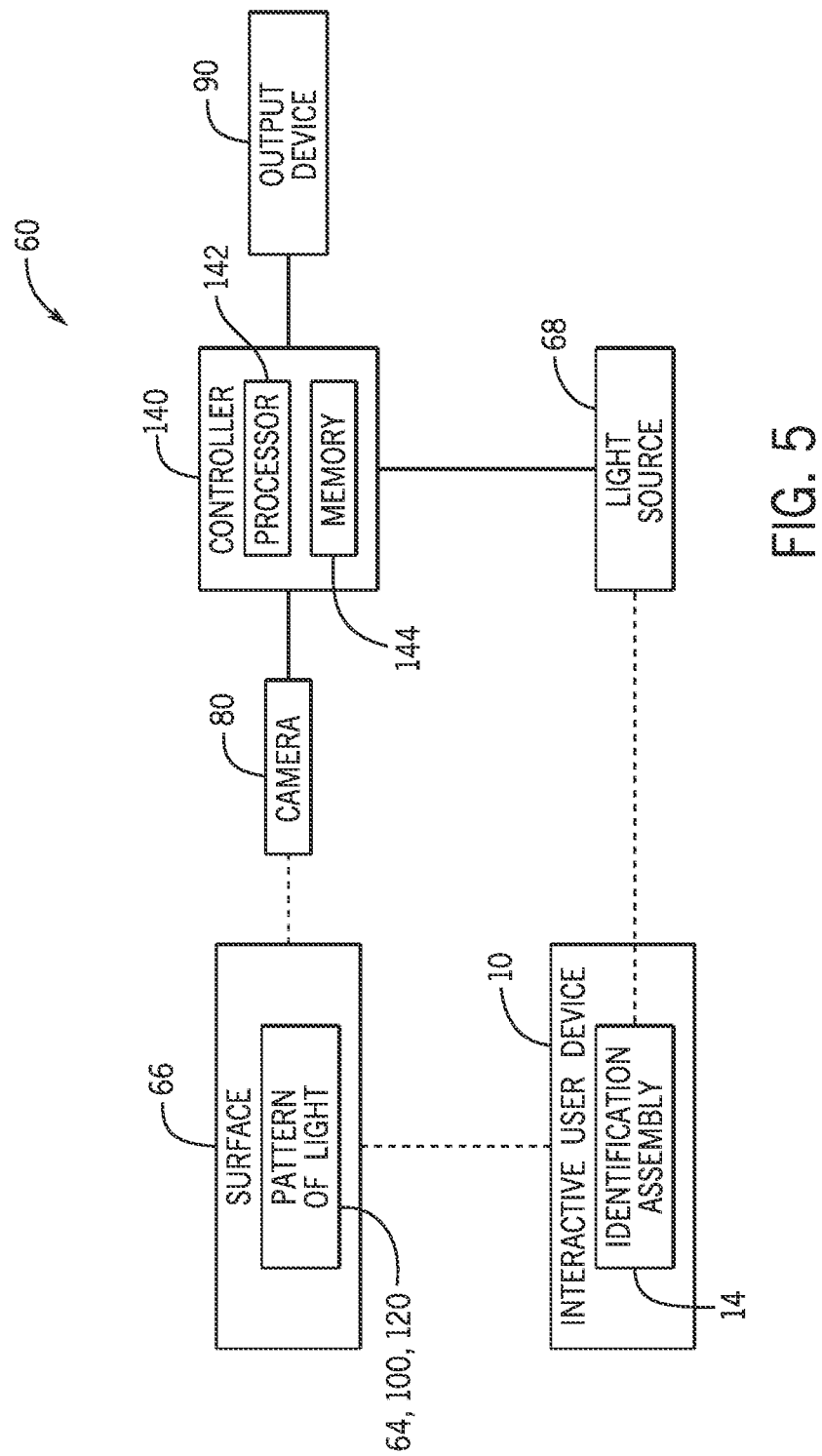
FIG. 5 is a block diagram of the entertainment system of FIGS. 2-4, according to an embodiment of the present disclosure.

FIG. 5 is a block diagram of the entertainment system 60 of FIGS. 2-4, according to embodiments of the present disclosure. As illustrated, the light source 68, which may be communicatively coupled to the controller 140, may emit light toward the identification assembly 14 of the user interactive device 10. The identification assembly 14 may reflect a pattern of light onto the surface 66. The pattern of light may include the pattern of light 64, the pattern of light 100, the pattern of light 120, and/or other suitable patterns of light. Additionally, the camera 80, which may be communicatively coupled to the controller 140, may capture the pattern of light displayed on the surface 66.

The controller 140 may determine a user interactive experience based on the identification data. Further, the controller 140 may be communicatively coupled to the output device 90, and instruct the output device 90 (e.g., an animated figure, an electronic display, a speaker) to provide the user interactive experience (e.g., to output an action, image, video, audio data, and so on). The controller 140 may be communicatively coupled to the light source 68, the camera 80, and/or the output device 90 by any suitable means, such as via wired communication or wireless communication over a communication network using a wireless communication protocol or technology (e.g., radio, Bluetooth, WiFi, infrared, Ethernet, Thread, ZigBee, Z-Wave, KNX, mobile, and/or microwave).

In certain embodiments, the processor 142 may perform pattern and/or image recognition techniques stored in the memory device 144 to detect the pattern of light captured by the camera 80. For example, an image captured by the camera 80 may include the pattern of light and the surface 66. Such image recognition techniques may enable the processor 142 to distinguish the pattern of light from the surface 66 generally, from other light reflected off the surface 66 (e.g., ambient light), and from other portions of a captured image of the surface 66. In certain embodiments, the surface 66 may include materials (e.g., plastics, ceramics, fabrics), shades/colors (e.g., white, black, grey), and/or markings (e.g., certain patterns or identifiers) that facilitate detection of the pattern of light.

The processor 142 may then determine the identification information based on the pattern of light. This may include comparing detected characteristics (e.g., portions of the pattern of light, frequencies within the pattern of light) with tables of information or running algorithms based on the detected characteristics to determine correlative identification information for the user interactive device 10, the user 62 associated with the user interactive device 10, and/or a user profile associated with the user interactive device 10.

In certain embodiments, the controller 140 may train and/or execute a machine learning model to perform the image recognition techniques, determine the identification information, and/or differentiate reflected identification features. For example, some processes described above may be performed by machine learning circuitry and/or software using data correlating the pattern of light to the user interactive device 10, the user 62, the user profile, and/or input from a user (e.g., the user 62 and/or another user). The machine learning circuitry (e.g., circuitry used to implement machine learning algorithms or logic) may access the data to identify patterns, correlations, or trends associated with the data. As used herein, machine learning may refer to algorithms and statistical models that computer systems use to perform a specific task with or without using explicit instructions. For example, a machine learning process may generate a mathematical model based on a sample of the clean data, known as "training data," in order to make predictions or decisions without being explicitly programmed to perform the task.

Depending on the inferences to be made, the machine learning circuitry may implement different forms of machine learning. In some embodiments, a supervised machine learning may be implemented. In supervised machine learning, the mathematical model of a set of data contains both the inputs and the desired outputs. The set of data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects (e.g. a first pattern of light and a second pattern of light, a captured pattern of light and a reference/stored pattern of light) are.

Additionally or alternatively, in some situations, it may be beneficial for the machine-learning circuitry to utilize unsupervised learning (e.g., when particular output types are not known). Unsupervised learning algorithms take a set of data that contains only inputs, and find structure in the data, like grouping or clustering of data. The algorithms, therefore, learn from test data that has not been labeled, classified or categorized. Instead of responding to feedback, unsupervised learning algorithms identify commonalities in the data and react based on the presence or absence of such commonalities in each new piece of data.

Cluster analysis is the assignment of a set of observations (e.g., datasets) into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between users of the same cluster, and separation, the difference between clusters. Predictions or correlations may be derived by the machine learning circuitry. For example, groupings and/or other classifications of the data may be used to identify potential modifications in the data and impacts of the modifications. The predictions may be provided to downstream applications, which may perform actions based upon the predictions. The actions that are performed may be mediated through a controller (e.g., the controller 140), either directly or through a coupled secure system, that has access to the data.

Additionally, the controller 140 may include one or more processors (illustrated and referred to in this disclosure as a single processor 142) and one or more memory or storage devices (illustrated and referred to in this disclosure as a single memory device 144). The processor 142 may execute software programs and/or instructions stored in the memory device 144 that facilitate determining identification data for the user interactive device 10, the user 62 associated with the user interactive device 10, and/or a user profile associated with the user interactive device 10 based on the pattern of light. Moreover, the processor 142 may include multiple microprocessors, one or more "general-purpose" microprocessors, one or more special-purpose microprocessors, and/or one or more application specific integrated circuits (ASICs). For example, the processor 142 may include one or more reduced instruction set computer (RISC) processors. The memory device 144 may store information such as control software, look up tables, configuration data, and so forth. The memory device 144 may include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium. The memory device 144 may store a variety of information and may be used for various purposes, such as instructions that facilitate determining identification data for the user interactive device 10, the user 62 associated with the user interactive device 10, and/or a user profile associated with the user interactive device 10 based on the pattern of light and/or determining a user interactive experience based on the identification information.

Figure 6:
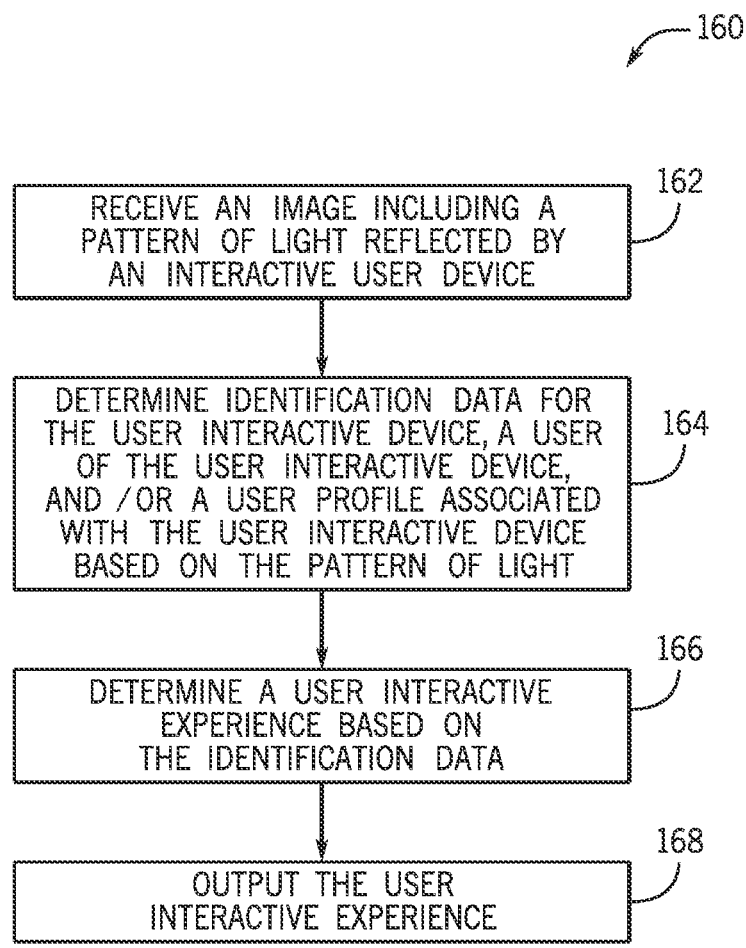
FIG. 6 is a flow diagram of a process for determining identification information and providing a user interactive experience for the user interactive device of FIG. 1, according to an embodiment of the present disclosure.

With the preceding in mind, FIG. 6 is a flow diagram of a process 160 for determining identification information for the user interactive device 10 based on a pattern of light reflected by the user interactive device 10 and providing a user interactive experience based on the identification information, according to embodiments of the present disclosure. The process 160 may be performed by any suitable system that may determine identification information for the user interactive device 10 and a user interactive experience. While the process 160 is described using steps in a specific sequence, it should be understood that the present disclosure contemplates that the described steps may be performed in different sequences than the sequence illustrated, and certain described steps may be skipped or not performed altogether. In some embodiments, the process 160 may be implemented by executing instructions stored in a tangible, non-transitory, computer-readable medium, such as the memory device 144, using a processor, such as the processor 142.

As illustrated, in process block 162, the processor 142 receives an image including a pattern of light (e.g., the pattern of light 64, the pattern of light 100, the pattern of light 120, and/or other suitable patterns of light). In particular, the camera 80 may capture an image of the pattern of light on the surface 66, and send the image to the controller 140 and the processor 142 in particular. The processor 142, which may be resident in the controller 140, may thus receive the image (e.g., data indicative of captured imagery).

In process block 164, the processor 142 determines identification data for the user interactive device 10, the user 62 associated with the user interactive device 10, and/or a user profile associated with the user interactive device 10 based on the pattern of light. As described above, the processor 142 may use pattern and/or image recognition techniques to determine/identify the pattern of light within the captured image. The processor 142 may query a database storing information correlating the pattern of light to the user interactive device 10, the user 62, and/or the user profile, to receive the identification data. Such a database may include multiple and unique correlations between patterns of light, user interactive devices, users, and/or user profiles. The database may be stored in the memory 144 or in another suitable memory or storage device of the entertainment system 60.

In process block 166, the processor 142 determines a user interactive experience based on the identification data. The user interactive experience may be specific and/or unique to the user interactive device 10, the user 62, and/or the user profile. For example, the user interactive experience may include providing an image, a video, audio, and/or actuation of a physical device that, for example, may be viewable or heard by the user 62.

In process block 168, the processor 142 instructs the output device 90 to perform the user interactive experience. For example, the processor 142 may output image data and/or video data to the display 90A, audio data to the speakers 90B, one or more instructions to actuate a physical device, and/or data to other suitable output devices 90 to instruct the output devices 90 to provide the user interactive experience. In some embodiments, the user 62 may interact with the entertainment system 60 during or after the user interactive experience, such as by moving and/or holding the user interactive device 10.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. An entertainment system comprising:
a user interactive device comprising an identification assembly, wherein the identification assembly is configured to generate a pattern of light via a reflective material;
a camera configured to capture the pattern of light generated by the reflective material; and
a controller having processing circuitry and a memory, the memory storing machine-readable instructions configured to cause the processing circuitry to:
receive an indication of the pattern of light; and
determine identification data associated with the user interactive device based on the pattern of light.

2. The entertainment system of claim 1, wherein the machine-readable instructions are configured to cause the processing circuitry to determine a user profile associated with the identification data.

3. The entertainment system of claim 2, wherein the machine-readable instructions are configured to cause the processing circuitry to output an interactive user experience based on the user profile.

4. The entertainment system of claim 1, wherein the pattern of light comprises a plurality of shapes, a Quick Response (QR) code, a bar code, a serial number, a product number, one or more light frequencies, one or more words, or any combination thereof.

5. The entertainment system of claim 4, wherein the machine-readable instructions are configured to cause the processing circuitry to:
determine a binary sequence based on the one or more light frequencies; and
identify the user interactive device based on the binary sequence.

6. The entertainment system of claim 1, comprising a light source configured to emit visible light, infrared light, ultraviolet light, or any combination thereof, wherein the camera is configured to capture the visible light, the infrared light, the ultraviolet light, or the combination thereof.

7. The entertainment system of claim 1, wherein the identification assembly comprises:
the reflective material; and
non-reflective material disposed on the reflective material, wherein the non-reflective material comprises apertures, and wherein the reflective material is configured to reflect light through the apertures to generate the pattern of light.

8. The entertainment system of claim 1, wherein the reflective material is configured in a pattern corresponding to the pattern of light.

9. The entertainment system of claim 1, wherein the user interactive device comprises a handheld device.

10. The entertainment system of claim 1, wherein the machine-readable instructions are configured to cause the processing circuitry to:
receive an indication of a change in positioning of the pattern of light over a time period; and
output an interactive user experience based on the change in positioning of the pattern of light over the time period, the identification data, or both.

11. One or more non-transitory, computer-readable media storing instructions which, when executed by at least one processor, cause the at least one processor to perform operations comprising:
receiving an indication of a pattern of light reflected by a user interactive device;
determining identification data associated with the user interactive device based on the pattern of light; and
providing an interactive user experience based on the identification data.

12. The one or more non-transitory, computer-readable media of claim 11, wherein the instructions cause the at least one processor to perform operations comprising:
receiving an image captured by an image sensor; and
determining the pattern of light based on the image.

13. The one or more non-transitory, computer-readable media of claim 11, wherein the pattern of light comprises one or more frequencies of light, and wherein the instructions cause the at least one processor to perform operations comprising:
determining a binary sequence based on the one or more light frequencies; and
identifying the user interactive device based on the binary sequence.

14. The one or more non-transitory, computer-readable media of claim 11, wherein the instructions cause the at least one processor to perform operations comprising:
receiving an indication of a user profile to be associated with the user interactive device during an initial identification sequence; and
storing an association of the user profile with the user interactive device in a database, wherein determining identification data associated with the user interactive device based on the pattern of light comprises searching the database to determine the association of the user profile with the user interactive device.

15. The one or more non-transitory, computer-readable media of claim 11, wherein providing the interactive user experience comprises providing image data, audio data, video data, or a combination thereof.

16. A user interactive device, comprising:
a body configured to be held by a user; and
an identification assembly coupled to the body, wherein the identification assembly comprises:
reflective material; and
non-reflective material disposed over the reflective material, wherein apertures are formed within the non-reflective material, and wherein the reflective material is configured to reflect light through the apertures to generate a pattern of light for identification of the user interactive device.

17. The user interactive device of claim 16, wherein the identification assembly comprises one or more frequency filters, and wherein each frequency filter of the one or more frequency filters is configured to filter light at a certain frequency, such that the one or more frequency filters are configured to generate the pattern of light at one or more frequencies.

18. The user interactive device of claim 17, wherein the one or more frequency filters comprise a plurality of frequency filters configured to generate the pattern of light at a plurality of frequencies.

19. The user interactive device of claim 16, wherein the body comprises one or more holding features configured to cause the user to hold the user interactive device at a certain orientation.

20. The user interactive device of claim 16, wherein the pattern of light comprises a plurality of shapes, a Quick Response (QR) code, a bar code, a serial number, a product number, one or more light frequencies, one or more words, or any combination thereof.

\* \* \* \* \*